United States Patent
Freiha

(10) Patent No.: US 7,120,439 B2
(45) Date of Patent: Oct. 10, 2006

(54) METHOD AND APPARATUS FOR MOBILE RADIO VELOCITY ESTIMATION

(75) Inventor: Fouad C. Freiha, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 47 days.

(21) Appl. No.: 10/712,174

(22) Filed: Nov. 13, 2003

(65) Prior Publication Data

US 2005/0107096 A1    May 19, 2005

(51) Int. Cl.
*H04Q 7/20*    (2006.01)
*H04B 7/00*    (2006.01)
(52) U.S. Cl. .................. 455/441; 455/522; 455/238.1
(58) Field of Classification Search ............... 455/441, 455/522, 238.1, 425; 375/344, 346
See application file for complete search history.

(56) References Cited

U.S. PATENT DOCUMENTS 6,591,168 B1    7/2003  Odinak et al.
2002/0172307 A1   11/2002  Sandberg

OTHER PUBLICATIONS

Mark D. Austin, Gordon L. Stuber, "Velocity adaptive handoff algorithms for microcellular systems", IEEE transactions on vehicular technology, vol. 43, N, 3.
E. Karastergios, M.A.K. Sumanasena and B,G, Evans, "Mobile velocity estimator for Ricean fading channels", Electronics letters, 5th Dec. 2002, vol. 38. No. 25.
Jian-Yu Lu, Xiao-Liang Xu, Hehong Zou, James Greenleaf, Application of Bessel for Doppler Velocity Estimation:, IEEE transactions on ultrasonics, ferroelectrics, and frequency control, vol. 42, N.4, Jul. 1995.
R. Clarke "A Statistical theory of mobile radio reception", Bell System Tech Journal vol. 47, pp. 957-1000, 1968.
Rappaport, Wireless Communications, Principles and Practice, 2nd Edition, ISBN o13-042232-0.

*Primary Examiner*—Matthew D. Anderson
*Assistant Examiner*—Eugene Yun

(57) ABSTRACT

A mobile radio velocity estimation system (100) includes an autocorrelation block (106) that determines the autocorrelation of a received signal (104) using one lag (102). A power determination block (108) determines the power of the received signal (104) and a divider block (114) divides the autocorrelation (110) by the power (112). Using a Bessel function lookup table (116) and a multiplication by $\lambda/\tau$ block (118), an estimate (120) for the mobile radio's velocity can be calculated. A method for estimating the velocity of a mobile radio (500) is also discussed.

9 Claims, 2 Drawing Sheets

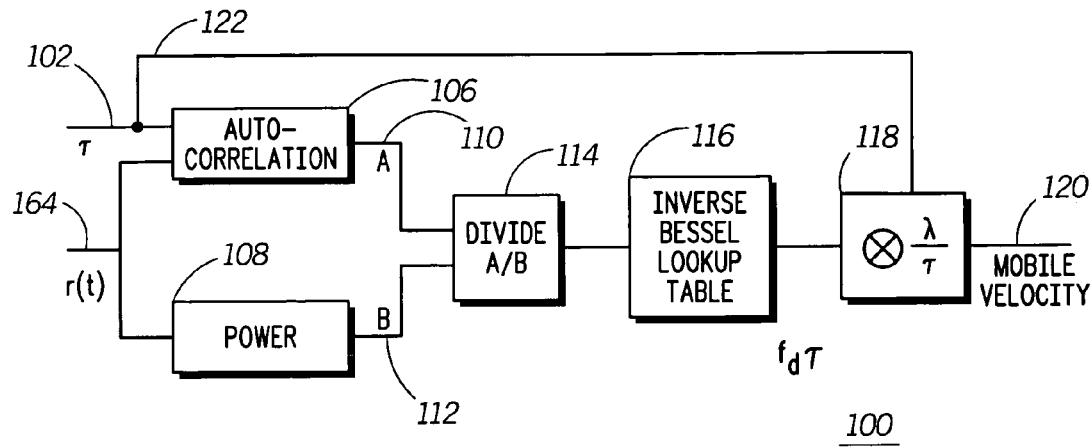
FIG. 1
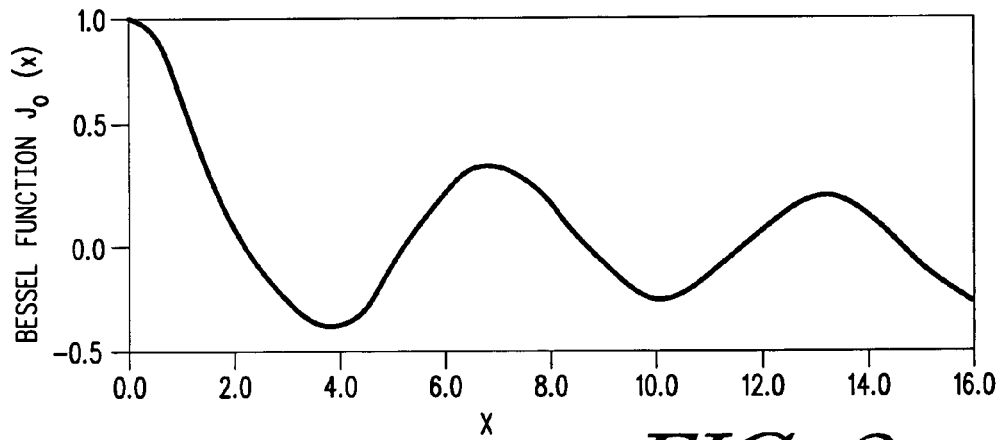
FIG. 2
| A/B | INVJ$_0$ (A/B) |
|---|---|
| 1.0000 | 0.0000 |
| 0.9900 | 0.2000 |
| 0.9604 | 0.4000 |
| 0.9120 | 0.6000 |
| 0.8463 | 0.8000 |
| 0.7652 | 1.0000 |
| 0.6711 | 1.2000 |
| 0.5669 | 1.4000 |
| 0.4554 | 1.6000 |
| 0.3400 | 1.8000 |
| 0.2239 | 2.0000 |
FIG. 3

METHOD AND APPARATUS FOR MOBILE RADIO VELOCITY ESTIMATION

TECHNICAL FIELD

This invention relates in general to the field of mobile radio communications and in particular to a method and apparatus for estimating the velocity of a mobile radio communication device.

BACKGROUND

Knowing the velocity of a mobile radio communication device such as a cellular telephone is very useful in numerous areas of mobile communications. For example, knowing the velocity a mobile radio is useful when performing call hand-offs, as well as when performing power control because velocity and magnitude of fade are related. In U.S. patent application publication No. US2002/0172307 A1, the Doppler spread proportional to the mobile velocity is computed using an autocorrelation function of a complex channel estimate and a detection of the zero-crossing of the complex autocorrelation based on a direct Bessel function is performed in order to estimate the mobile's velocity. This technique requires the computation of several autocorrelations with several lags until the first zero crossing and produces a computationally cumbersome algorithm. Other prior art velocity estimation techniques also require a lot of computations in order to estimate a mobile radio's velocity. Given this, a need exists in the art for a method and apparatus for mobile radio velocity estimation that can minimize some of the problems in the prior art.

BRIEF DESCRIPTION OF THE DRAWINGS

The features of the present invention, which are believed to be novel, are set forth with particularity in the appended claims. The invention may best be understood by reference to the following description, taken in conjunction with the accompanying drawings, in the several figures of which like reference numerals identify like elements, and in which:

FIG. 1 shows a block diagram of a velocity estimation system in accordance with one embodiment of the invention.

FIG. 2 shows a graph of a typical Bessel functions $J_o(x)$ function of x in accordance with an embodiment of the invention.

FIG. 3 shows a table of an inverse Bessel function utilized in the graph of FIG. 2 in accordance with an embodiment of the invention.

DETAILED DESCRIPTION OF THE PREFERRED EMBODIMENT

Figure 4:
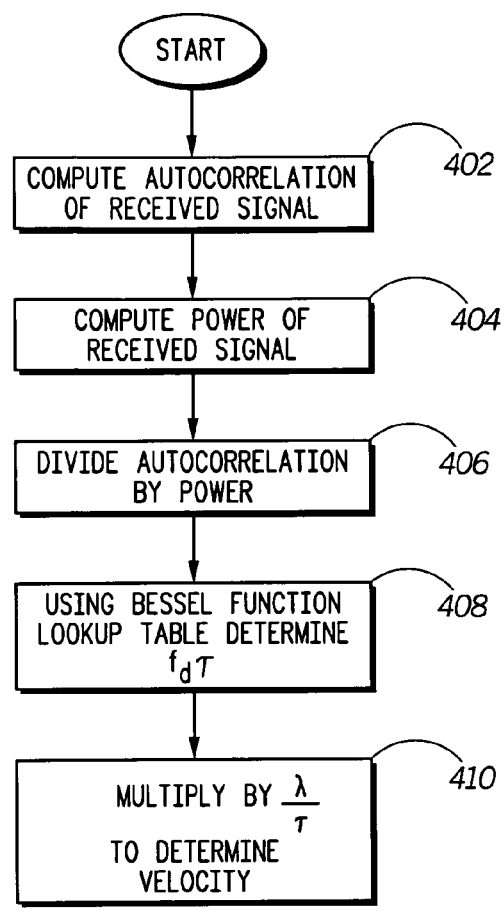
FIG. 4 shows a flowchart highlighting some of the steps taken in accordance with an embodiment of the invention.

While the specification concludes with claims defining the features of the invention that are regarded as novel, it is believed that the invention will be better understood from a consideration of the following description in conjunction with the drawing figures.

Referring now to FIG. 1, there is shown a block diagram of a velocity estimation system that can be used in a radio communication device. The velocity estimation system 100 in one embodiment is performed by a Digital Signal Processor (DSP) which performs the functions of the velocity estimation system. Although a DSP is preferably used, other controllers, hardware and or hardware/software combinations can be used to perform the functions of the velocity estimation system 100.

When a radio communication device (also referred to as a Mobile Station or MS) such as a cellular telephone is in motion, it introduces a Doppler, or frequency shift into the incident plane wave. The Doppler frequency can be determined as follows, $$f_d = \frac{v}{\lambda} \qquad \text{(Equation 1)}$$

where,
v Velocity of the mobile,
λ Wavelength of the signal, and
$f_d$ Doppler frequency.

For macro-cellular applications as an example, it is reasonable to assume that the plane waves arrive at the MS antenna from all directions with equal probability. Under this assumption, R. Clarke's (see R. Clarke, "A statistical theory of mobile radio reception", Bell System Technical Journal, Vol. 47, pp. 957–1000, 1968.) two-dimensional isotropic scattering gives the autocorrelation of the received signal:

$$E[r(t)r(t-\tau)] = E[r(t)^2] J_0(2\pi f_d \tau) \qquad \text{(Equation 2)}$$

where in Equation 2,
$E[r(t)r(t-\tau)]$ Autocorrelation of the received signal,
τ Lag associated with the correlation,
$E[r(t)^2]$ Signal power, and
$J_0$ Bessel function of order 0.

The scattering model was verified by Clarke with field data. In heavily built-up areas like New York City, the mobile reception matches the scattered model. In the suburbs (or other non built-up areas) when the mobile is close to the transmitter, there will be a direct line-of-sight issue that is dealt with in accordance with an embodiment of the invention by adding it to the power and the autocorrelation and taking their division which will help alleviate the line-of-sight problem as well be discussed further below.

In FIG. 1, the lag "τ" 102 is a parameter of the system, the received signal r(t) 104 is an input and both its autocorrelation in autocorrelation block 106 (depending on the lag and sampling several values have to be in memory) and power in power block 108 are computed. Then, the autocorrelation result (A) 110 is divided by the power (B) 112 in block 114. According to Equation 2, the output of block 114 is the inverse Bessel function of $2\pi f_d \tau$. Using a Bessel function table lookup 116 saved in memory, such as in DSP memory, $f_d \tau$ can be determined using block 118 (and according to Equation 1), and an estimate 120 of the velocity of the MS can be provided.

The velocity estimation system 100 performs algebraic steps on Equation 2 to extract the Doppler frequency, $f_d$, which is a function of the velocity according to Equation 1. In the process, Equation (2) becomes:

$$v = \lambda \frac{\text{Inverse} J_0\left(\frac{E[r(t)r(t-\tau)]}{E[r(t)^2]}\right)}{2\pi\tau} \qquad \text{(Equation 3)}$$

From equation 3, for simplicity of the "divide A/B" block 114, we define the normalized autocorrelation as:

$$\frac{A}{B} = \frac{E[r(t)r(t-\tau)]}{E[r(t)^2]} \quad \text{(Equation 4)}$$

The "InverseJo" does not exist mathematically, but using the direct Bessel function, a mathematical table can be made where Y=InverseJo(x). The Bessel function presents an oscillation as shown in FIG. 2 (Bessel function Jo(x) as a function of x) that can cause two values to be represented by one velocity so the part that is monotonous is only kept and shown in the table of FIG. 3. Keeping the positive monotonous part of the Bessel function gives limitations on the choice of τ as a parameter of the device.

Referring to FIG. 4, a simplified flow chart discussing the steps of performing the MS velocity estimation in accordance with an embodiment of the invention is shown. In step 402, the autocorrelation of the received signal is computed. In step 404, the power of the received signal is computed, while in step 406, the autocorrelation result is divided by the power. In step 408, using a Bessel function lookup table like that shown in FIG. 3 the $f_d\tau$ is determined. In step 410, $f_d\tau$ is multiplied by λ/τ in order to determine the velocity of the MS.

After the velocity estimate has been determined, the radio communication device can transmit this information back to the communication system (e.g., cellular system controller) so that the communication system can make better call hand-off, power control or other types of system decisions. The velocity estimate information can also be used to change setting in the radio communication device itself (e.g., turn-off display, raise the volume setting, turn mobile radio off, etc.) the changes can be done by the radio communication device or by the communication system by sending a control signal to the radio communication device (assuming radio communication device transmits the velocity information back to the communication system).

Figure 5:
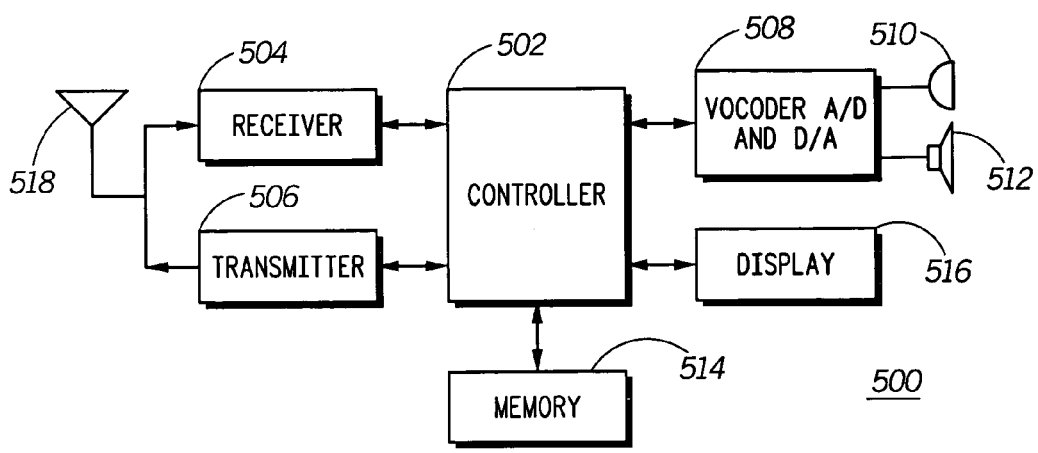
FIG. 5 shows a block diagram of a radio in accordance with an embodiment of the invention.

In FIG. 5, there is shown a block diagram of a radio communication device such as a cellular telephone 500. Cellular telephone 500 includes an antenna 518 which is selectively coupled to conventional receiver 504 and transmitter 506 sections. A controller, such as a microprocessor and/or Digital Signal Processor (DSP), provides the overall control for telephone 500. Memory 514 coupled to the controller 502 such as Random Access Memory (RAM), Read-Only Memory (ROM), FLASH, etc. stored all of the algorithms and variables needed by cellular telephone 500. A display 516 provides visual information to the cellular telephone user. An audio processing block 508 such as a vocoder and Analog-to-Digital (A/D) and Digital-to-Analog (D/A) block provides all the necessary audio processing for both incoming and outgoing voice traffic. Coupled to the audio processing block 508 is a speaker 512 and microphone 510.

In accordance with one embodiment of the invention, the controller which can include a DSP, performs all of the velocity estimation calculations previously described an acts as the velocity estimation block. The lag and inverse Bessel function table information are stored in memory 514 and accessed by the controller 502 when performing the velocity estimate method previously described.

Limitations on the Choice of τ:

From FIG. 2 one can determine that the Bessel function is monotonous and positive between 0.0 and 2.0. That implies according to Equation 3 that:

$$0.0 \le \frac{2\pi\tau v}{\lambda} \le 2.0 \quad \text{(Equation 5)}$$

As an illustrative example, in a mobile cellular communication system, the wavelength is typically fixed at approximately 900 MHz or 1800 MHz depending on the particular system, while velocities of an MS are between 0 to 200 km/h if the MS is in a car and up to 500 km/h if it is located in a high-speed train. Given the upper value of the velocity $v_{max}$ and the wavelength, one can choose a lag τ from the following interval:

$$0.0 \le \tau \le \frac{\lambda}{\pi v_{max}}. \quad \text{(Equation 6)}$$

Depending on the particular communication system and design requirements, the best choice of the signal sampling interval and how that affects the theoretical choice of the correlation lag τ should be reviewed when implementing a velocity estimation system. It is also important to analyze the effect of non-line-of-sight and line-of-sight fading on the accuracy of the velocity estimation when implementing the system.

The mobile radio estimation system provides for a fairly simple way of estimating mobile radio velocity, which in turn can be used for numerous applications such as when making power control adjustments, hand-off strategies, etc. The method relies on computing velocity from the auto-correlation function applied to captured I/Q (inphase and quadrature phase) data, using the inverse Bessel function ($J_O$) in the region before its first null. The velocity estimation system of the present invention uses a known fixed lag in the autocorrelation calculation which is faster than using zero crossing estimations. Also, the present invention does not require the need to send a known data pattern in order to estimate the velocity which simplifies the system.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A radio, comprising:
   a receiver for receiving a radio signal; and
   a velocity estimation block coupled to the receiver for estimating the velocity of the radio, the velocity estimation block including:
      an autocorrelation block coupled to the receiver for determining the
      autocorrelation of the received signal using a predetermined lag;
      a power block coupled to the receiver for determining the power of the received signal; and
      a Bessel lookup table coupled to the autocorrelation and power blocks for estimating the velocity of the radio;
   wherein the velocity estimation block estimates the velocity of the radio using the equation $$v = \lambda \frac{InverseJ_0\left(\frac{E[r(t)r(t-\tau)]}{E[r(t)^2]}\right)}{2\pi\tau},$$

where, $E[r(t)r(t-\tau)]$ Autocorrelation of the received signal, $\tau$ Lag associated with the correlation, $E[r(t)^2]$ Signal power, $J_0$ Bessel function of order 0, v Velocity of the radio communication device, $\lambda$ Wavelength of the signal; and Inverse $J_0 0$ values found in the inverse Bessel function table.

2. A radio as defined in claim 1, wherein the Bessel lookup table comprises an inverse Bessel lookup table.

3. A radio as defined in claim 2, wherein the autocorrelation determined by the autocorrelation block is divided by the power determined by the power block in order to determine the inverse Bessel function of $2\pi f_d\tau$, where $f_d$ is the Doppler frequency caused by the movement of the radio and $\tau$ is the predetermined lag.

4. A radio as defined in claim 3, wherein the predetermined lag is stored in the radio.

5. A radio as defined in claim 4, wherein the inverse Bessel lockup table is stored in the radio.

6. A radio us defined in claim 5, comprises a cellular telephone.

7. A radio as defined in claim 1, wherein the velocity estimation block comprises a Digital Signal Processor performing velocity estimation calculations.

8. A radio as defined in claim 1, wherein the lag (tau) is chosen from the interval 0.0<=tau<=^/(pi*vmax), where vmax is the maximum velocity of the mobile radio and ^ is the wavelength of the received signal.

9. A method for estimating the velocity of a radio communication device, comprising the steps of:

receiving a signal at the radio communication device;

computing the power of the received signal;

computing the autocorrelation of the received signal using a single lag associated with the correlation; and using an inverse Bessel function table and the computed power and autocorrelation to provide an estimate of the velocity of the radio communication device;

wherein the single lag and the inverse Bessel function table are stored in the radio communication device; and wherein the method is performed using a controller that uses the equation:

$$v = \lambda \frac{InverseJ_0\left(\frac{E[r(t)r(t-\tau)]}{E[r(t)^2]}\right)}{2\pi\tau},$$

where, $E[r(t)r(t-\tau)]$ Autocorrelation of the received signal, $\tau$ Lag associated with the correlation, $E[r(t)^2]$ Signal power, $J_0$ Bessel function of order 0, v Velocity of the radio communication device, $\lambda$ Wavelength of the signal; and Inverse $J_0 0$ values found in the inverse Bessel function table.

* * * * *